United States Patent
Gadde et al.

(10) Patent No.: US 10,204,109 B2
(45) Date of Patent: Feb. 12, 2019

(54) MECHANISM FOR AUTOMATIC CREATION AND ACCESS TO FAVORITE PERSONAL CLOUD DATA

(71) Applicant: MCAFEE, INC., Santa Clara, CA (US)

(72) Inventors: Kranthikumar Gadde, Bangalore (IN); Mitesh Kumar, Bangalore (IN); Kamlesh Halder, Bangalore (IN); Raj Vardhan, Bangalore (IN); Srikanth Nalluri, Bangalore (IN); Dattatraya Kulkarni, Bangalore (IN); Susmita Nayak, Fremont, CA (US); Krishnapur Venkatasubrahmanyam, Bangalore (IN)

(73) Assignee: McAfee, LLC, Santa Clara, CA (US)

( * ) Notice: Subject to any disclaimer, the term of this patent is extended or adjusted under 35 U.S.C. 154(b) by 13 days.

(21) Appl. No.: 14/392,295

(22) PCT Filed: Nov. 23, 2015

(86) PCT No.: PCT/US2015/062167
§ 371 (c)(1),
(2) Date: Dec. 23, 2015

(87) PCT Pub. No.: WO2016/105778
PCT Pub. Date: Jun. 30, 2016

(65) Prior Publication Data
US 2016/0196274 A1 Jul. 7, 2016

Related U.S. Application Data

(60) Provisional application No. 62/096,681, filed on Dec. 24, 2014.

(30) Foreign Application Priority Data

Jan. 6, 2015 (IN) .............................. 100/CHE/2015

(51) Int. Cl.
G06F 7/00 (2006.01)
G06F 17/30 (2006.01)
G06F 21/62 (2013.01)

(52) U.S. Cl.
CPC .. *G06F 17/30091* (2013.01); *G06F 17/30144* (2013.01); *G06F 17/30174* (2013.01); *G06F 21/6218* (2013.01)

(58) Field of Classification Search
None
See application file for complete search history.

(56) References Cited

U.S. PATENT DOCUMENTS 7,124,272 B1 10/2006 Kennedy et al.
2007/0294320 A1 12/2007 Yueh et al.
(Continued)

OTHER PUBLICATIONS

PCT/US2015/062167, ISR/Written Opinion, dated Apr. 11, 2016.
(Continued)

*Primary Examiner* — Tuan A Pham
(74) *Attorney, Agent, or Firm* — Hanley, Flight & Zimmerman, LLC (57) ABSTRACT

Distributed favorite files are stored in a favorite storage device. An agent dynamically monitors usage statistics for a plurality of files, wherein the plurality of files are located on a plurality of devices, designates a first file of the plurality of files as a favorite file based on usage statistics for the first file, and in response to designating the first file as a favorite file, stores a copy of the first file on a favorites storage device.

9 Claims, 11 Drawing Sheets

(56) References Cited

U.S. PATENT DOCUMENTS

| | | | |
|---|---|---|---|
| 2008/0072255 A1* | 3/2008 | Kim | H04H 60/31 |
| | | | 725/46 |
| 2009/0083362 A1* | 3/2009 | Svendsen | G06F 17/30017 |
| | | | 709/201 |
| 2009/0144283 A1 | 6/2009 | Clark et al. | |
| 2012/0102286 A1 | 4/2012 | Holt et al. | |
| 2012/0300931 A1 | 11/2012 | Ollikainen et al. | |
| 2013/0204961 A1* | 8/2013 | Fliam | H04L 67/2885 |
| | | | 709/214 |
| 2013/0275653 A1* | 10/2013 | Ranade | G06F 3/0605 |
| | | | 711/103 |
| 2013/0290598 A1* | 10/2013 | Fiske | G06F 3/0625 |
| | | | 711/103 |
| 2014/0089257 A1* | 3/2014 | Ignacio | G06F 17/303 |
| | | | 707/609 |
| 2014/0188870 A1* | 7/2014 | Borthakur | G06F 17/30312 |
| | | | 707/736 |

OTHER PUBLICATIONS

European Patent Office, "Supplementary European Search Report," issued in connection with application No. 15873984.7, dated May 9, 2018, 13 pages.

International Bureau, "International Preliminary Report on Patentability," issued in connection with International Application No. PCT/US2015/062167, dated Jul. 6, 2017 (15 pages).

European Patent Office, "Extended European Search Report" issued in connection with European Application No. 15873984.7, dated Aug. 10, 2018 (11 pages).

* cited by examiner

MECHANISM FOR AUTOMATIC CREATION AND ACCESS TO FAVORITE PERSONAL CLOUD DATA

TECHNICAL FIELD

Embodiments described herein generally relate to secure distributed backup for personal device and cloud data, and more particularly to a mechanism for backing up personal cloud data residing on any device or service, on any device or service, using any user device while providing the user full control over the encryption of the data.

BACKGROUND ART

Many studies show a usage trend where consumers typically use multiple devices, such as smart phones, tablet computers, and personal computers, and also use one or more cloud services, such as cloud storage, social networks, photo sharing sites, and chat services. Users effortlessly switch between devices and services, but a user's access to particular data may be restricted based on a device the user is currently using, and what kind of network connection the particular user device provides to connect to other devices or services.

As an example, a user reading a document on a laptop may head to an airport for a business trip. The user keeps the laptop bag in the overhead cabin, as he puts the seatbelt on for take-off, realizes he should have copied the document on to his tablet for reading in the flight. This scenario may be an inconvenience for several reasons. First, the device that hosts the data might be offline from internet, turned off, or not near the user. Second, the service that hosts the data may not be accessible due to lack of internet or expensive internet access charge. Third, the user may not have the time to manually aggregate favorite data items into a common device that accompanies the user. Finally, further, the smaller form factor devices may not have the storage necessary to store all of the favorite content.

DESCRIPTION OF EMBODIMENTS

In one or more embodiments, the disclosure provides a mechanism to automatically create "favorites" folder on a favorites storage device for user data footprint across all of personal cloud. The favorites may be continually synchronized with respective sources and are accessible from any device that user may have access to. In one or more embodiments, favorites are built for the entire personal cloud, and not just for data hosted on a single device or single cloud service. The favorites storage device can be a simple USB storage, smart storage (such as the Intel® NASHUA device), or another computer or storage device with a larger amount of storage.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "personal cloud" refers to user data footprint across multitude of devices (phones to tablets to PCs) and cloud services.

As used herein, the term "computer system" can refer to a single computer or a plurality of computers working together to perform the function described as being performed on or by a computer system.

As used herein, the term "network device" can refer to any computer system that is capable of communicating with another computer system across any type of network.

Figure 1:
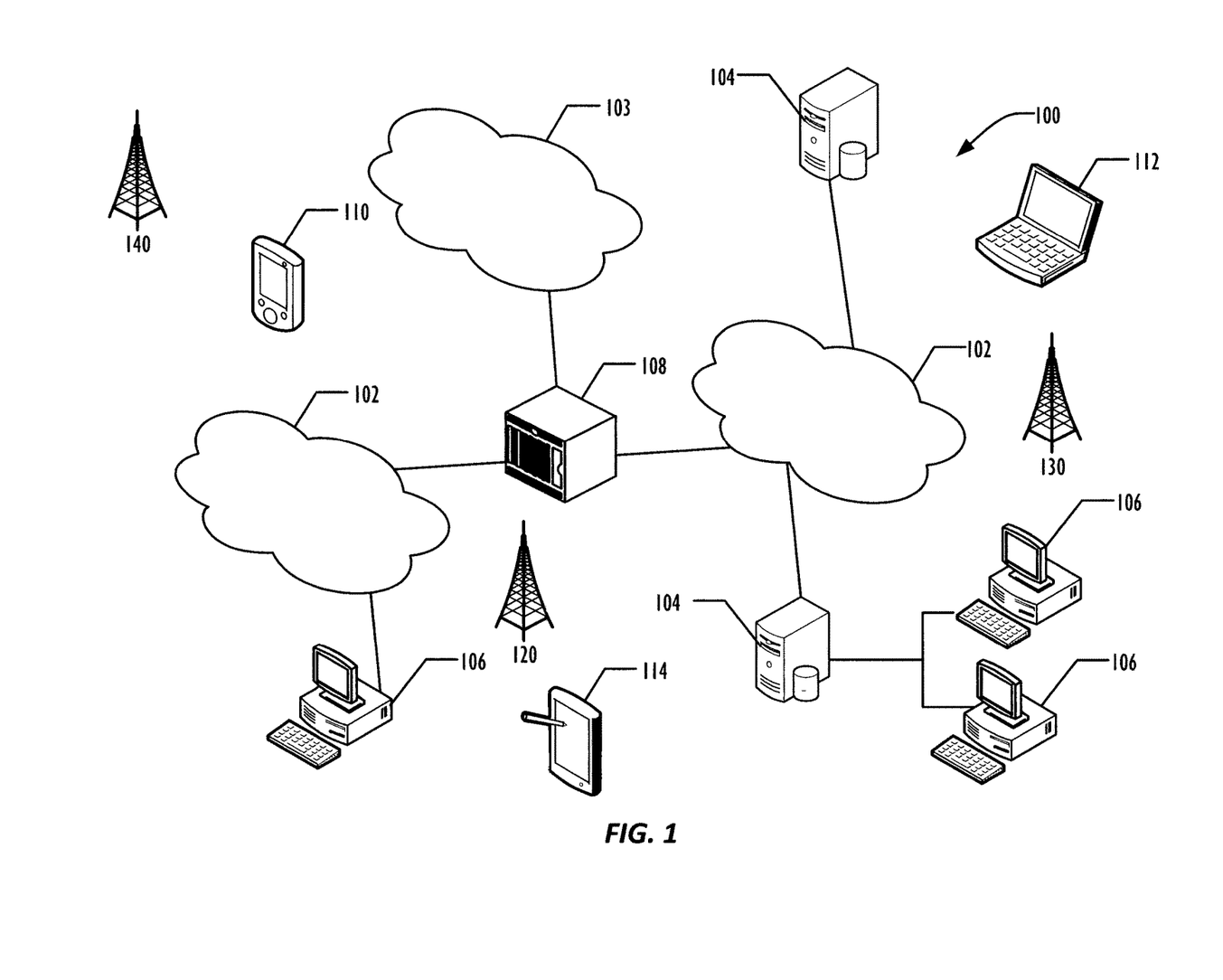
FIG. 1 is a diagram illustrating a network of programmable devices according to one or more embodiments.

Referring to the figures, FIG. 1 an example infrastructure 100 in which embodiments may be implemented is illustrated schematically. Infrastructure 100 contains computer networks 102. Computer networks 102 may include many different types of computer networks available today, such as the Internet, a corporate network, or a Local Area Network (LAN). Each of these networks can contain wired or wireless programmable devices and operate using any number of network protocols (e.g., TCP/IP). Networks 102 may be connected to gateways and routers (represented by 108), end user computers 106, and computer servers 104. Infrastructure 100 also includes cellular network 103 for use with mobile communication devices. Mobile cellular networks support mobile phones and many other types of mobile devices. Mobile devices in the infrastructure 100 are illustrated as mobile phones 110, laptops 112, and tablets 114. A mobile device such as mobile phone 110 may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers 108. In addition, the mobile devices 110, 112, and 114 may interact with non-mobile devices such as computers 104 and 106 for desired services, which may include providing the application, script, or web content in web pages to a secure enclave module. The functionality of the gateway device may be implemented in any device or combination of devices illustrated in FIG. 1; however, most commonly is implemented in a firewall or intrusion protection system in a gateway or router.

Figure 2:
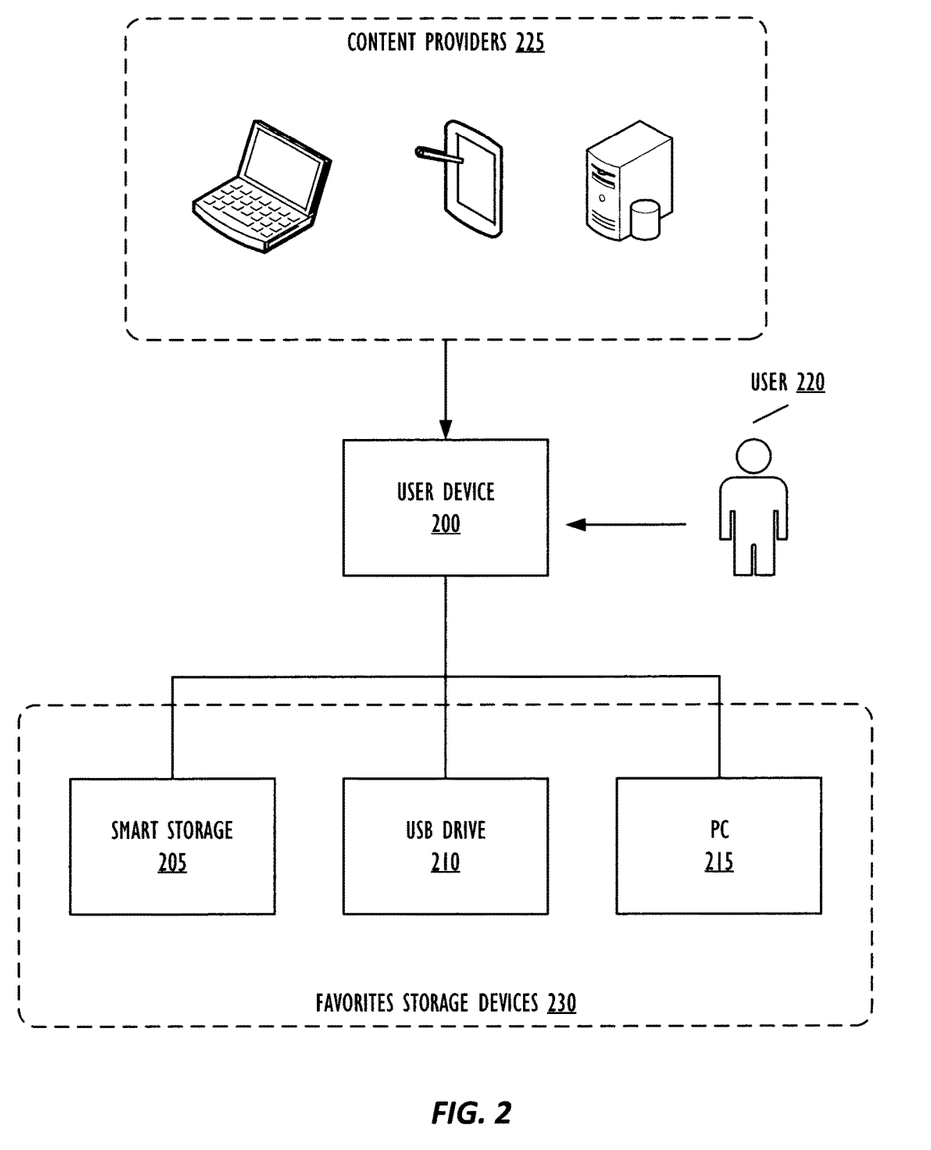
FIG. 2 is a diagram illustrating a network architecture for automatic creation and access to favorite personal cloud data.

FIG. 2 is a diagram illustrating a network architecture for automatic creation and access to favorite personal cloud data. The system provides the ability to identify/detect the favorite content from content providers 225 such as those in a personal cloud by usage patterns of user and automatically storing the content on a designated favorites storage device (USB storage 210, smart storage 205, a personal computer 215, or the like). The user 220 may designate the favorites storage device 230 as a host for favorites. Once designated, the device is recognized by all agents as a host for favorites.

The usage statistics collected may include, but are not limited to: frequency of access; recently created/updated; explicit tagging as Favorite, Important, Private or a star rating by user; sharing on social networks and actively discussed in social networks (such as Likes, comments); periodicity of access, such as bills saved to a folder on a monthly basis; and a score based on "links" in file. The agents collectively derive "links" to other files in the personal cloud. These links are similar to inbound links in google search. The links are derived through various mechanisms. One mechanism correlates data from social networks such as tags for a photograph to an image on local disk. Another example would be that photos that are associated with the same geo-location are linked together.

Based on the decision criteria favorites are opportunistically synchronized to get the relevant data from respective host devices/services. Favorite devices like USB Drive 230(?) that do not have the ability to connect to the internet, connect via devices (such as a personal computer) they are plugged into.

Access to favorites is protected by authentication mechanism—password, biometric or otherwise. That is, in one or more embodiments, the one or more favorites storage devices 230 may include secure storage that requires authentication in order to access data. In one or more embodiments, a one-click mechanism may allow a user to recover all of the favorite content from respective device/service locations even if the favorites storage device is lost.

In one or more embodiments, when a user 220 requests a read of content from content providers 225 checks for availability on favorites storage device 230 first, to provide offline or more efficient access. For example, obtaining data from a favorites storage device 230 may require less resources because it may be accessed across a local network rather than from cloud storage for example.

Because the content is available on favorites storage device, user 220 may quickly access the content. For example, the user 220 may to read an important document on his or her mobile device 200 while travelling in a plane. The document is being used on PC 225 frequently. The mechanism identifies that the document is used frequently and it will be cached on favorites storage device 230 so that it will be accessible from mobile device during the journey. The favorites storage device 230 may be accessible by the user device 200 through any local connection, such as a Bluetooth connection, a USB drive, or the like.

The collection of personal cloud data in a favorites storage device 230 may also allow the user 220 to view all favorite content across devices and cloud services. For example, user data identified as favorites data may originate from multiple devices and storage systems. In one or more embodiments, the user 220 may access the favorites storage device through a user interface that allows the user to view all favorite data regardless of the locations from which it was originally stored. The user may also access the content even if the source device is offline from the internet. In one or more embodiments, the user can search the content across all devices, cloud services and can tag any file(s) as favorite. In one or more embodiments, the user can recover all of the favorite content across all devices and cloud services, by a single click because the application/server retains the map (location/tokens to access) for content that is accumulated in the favorites folders.

In one or more embodiments, the favorite content may be cached on a device opportunistically. For example, the favorites may be cached on the favorites storage device 230 by using optimal communication channel. For example, if the content provider 225 is another device which is in the same network, then the content is cached via an optimal communication channel, such as a P2P channel. As another example, the content may be cached on the favorites storage device 230 only when device is connected to Wi-Fi network, by synching while the device is being charged, so as to conserve battery, or by synching during low tariff periods as specified by the user.

Figure 3:
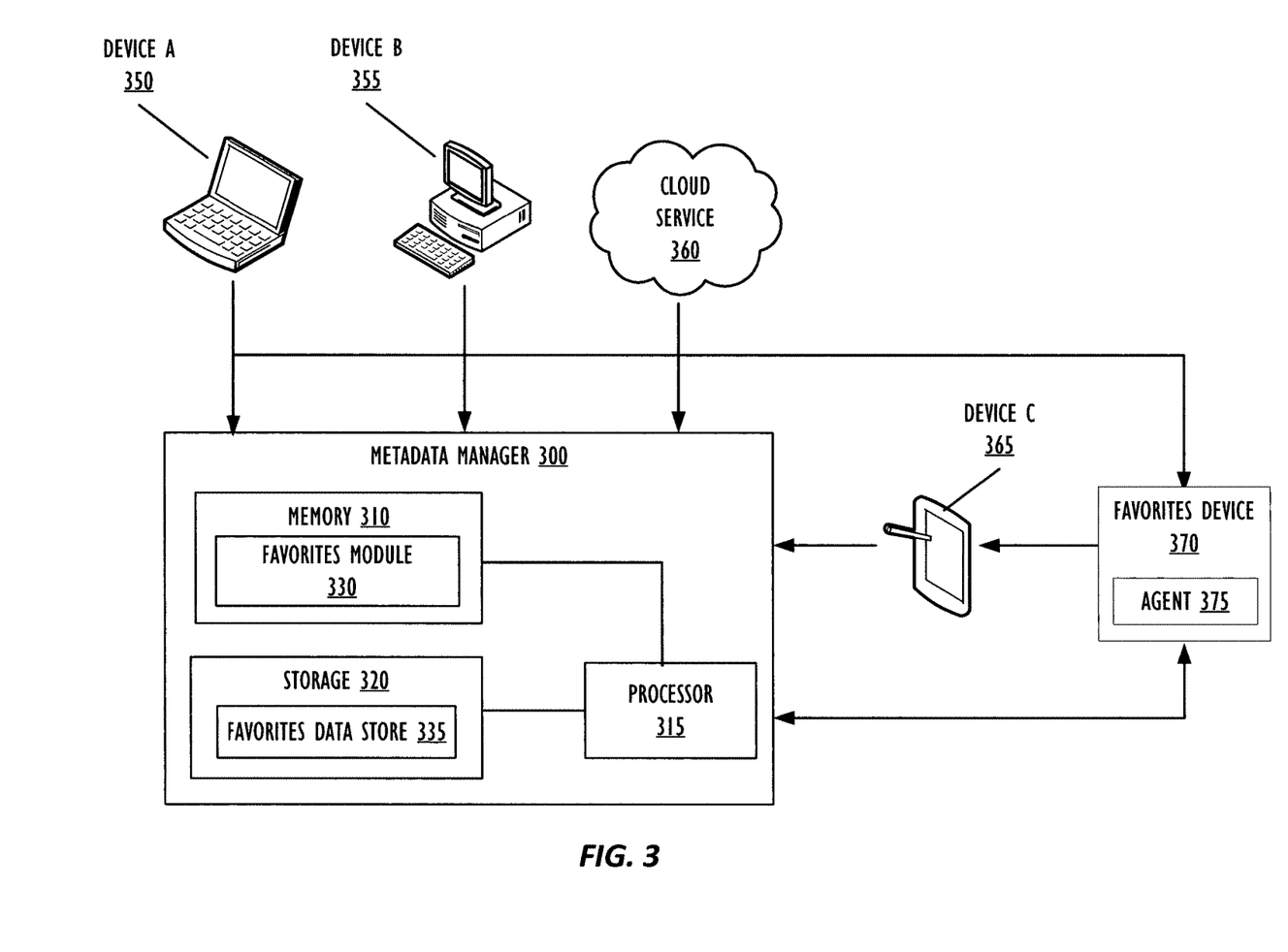
FIG. 3 is a diagram illustrating a system for automatic creation and access to favorite personal cloud data.

FIG. 3 shows interaction among user's devices, cloud services, favorites storage devices 370, and a metadata manager 300. The system depicted in FIG. 3 provides the ability to map and provide uniform and location-agnostic access for favorite content across all devices and cloud services. An agent, for example agent 375, running on each device syncs metadata of the devices and cloud service to server, or metadata manager 300. Metadata manager 300 maintains map of metadata and host on which data resides. An agent 375 running on favorites storage device 370 keeps map of authenticated clients to avoid unauthenticated access. The agent 375 running on favorites storage device always keeps favorite folder in sync with the metadata manager 300.

Metadata manager 300 is depicted as including a memory 310, a storage 320, and a processor 315. In addition, although not depicted, Device A, Device B, Device C, and Favorites storage device may also include a similar memory, storage, and/or processor. Processor core 315 may be the core for any type of processor, such as a micro-processor, an embedded processor, a digital signal processor (DSP), a network processor, or other device to execute code. Although only one processor core is illustrated in each trusted device in FIG. 3, a processing element may alternatively include more than one of the processor core 315 illustrated in FIG. 3. Processor core 315 may each be a single-threaded core or, for at least one embodiment, processor core 315 may be multithreaded in that it may include more than one hardware thread context (or "logical processor") per core.

Metadata manager 300 includes a memory 310 coupled to the processor 315. Memory 310 may be any of a wide variety of memories (including various layers of memory hierarchy) as are known or otherwise available to those of skill in the art. Program code, or instructions, such as favorites module 330, may be stored in, for example, volatile and/or non-volatile storage 320, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible, non-transitory medium through which the program code may pass, such as antennas, optical fibers, communications interfaces, etc. Program code may be transmitted in the form of packets, serial data, parallel data, etc., and may be used in a compressed or encrypted format. The processor core 315 follows a program sequence of instructions indicated by the code. In this manner, processor core 315 is transformed during execution of the code.

Files monitored or determined to be favorite files may come from any number of content providers, such as Device A 350, Device B 355, or cloud services 360. The location for content identified as favorite content may be stored in favorites data store 335. Favorites data store 335 may be stored on a storage 320 in metadata manager 300. Storage 320 may be USB storage, a smart storage device, or any other kind of secure storage device. Although not illustrated in FIG. 3, a processing element may include other elements on chip with the processor core 315. For example, a processing element may include memory control logic along with the processor cores. The processing element may include I/O control logic and/or may include I/O control logic integrated with memory control logic. The processing element may also include one or more caches.

Figure 4:
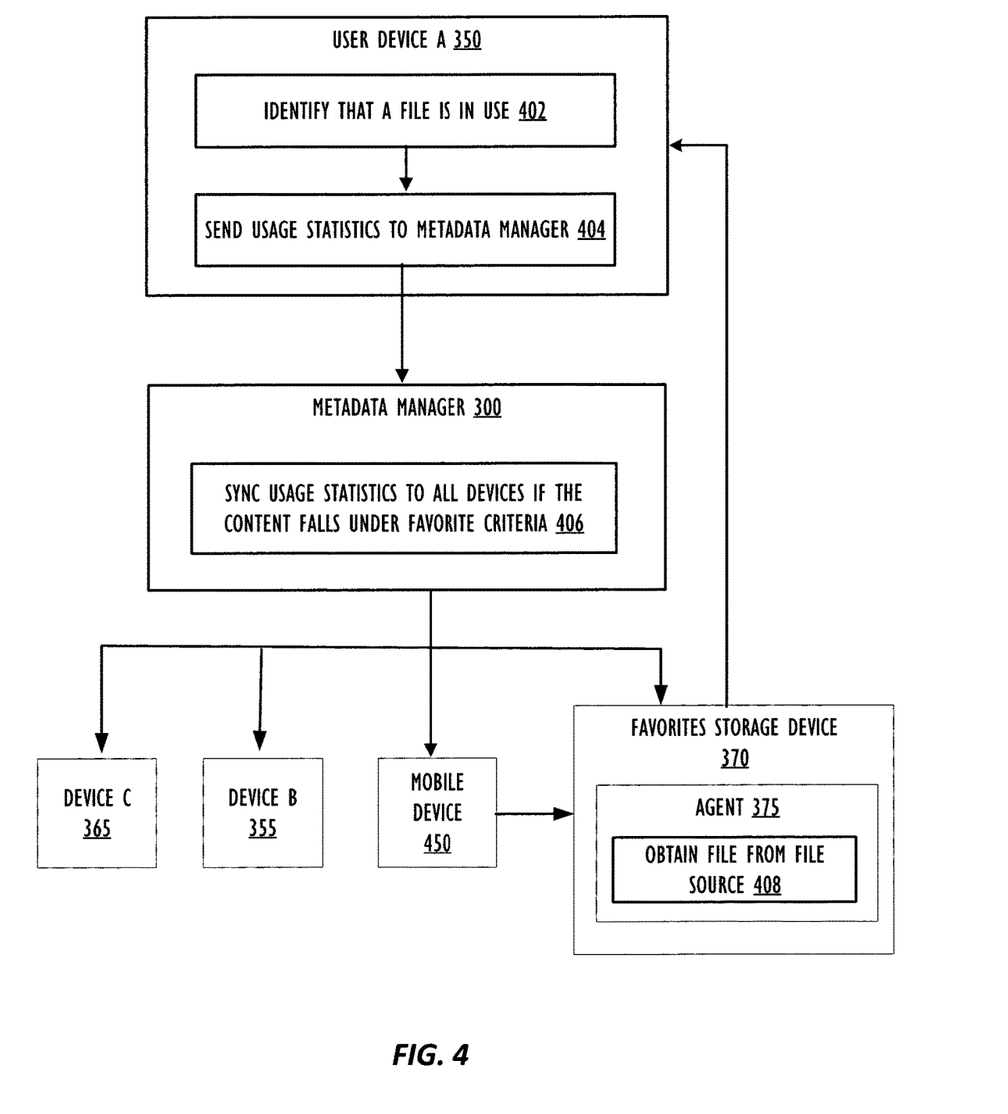
FIG. 4 is a flow diagram illustrating a technique for automatically creating favorite personal cloud data.

FIG. 4 is a flow diagram illustrating a technique for automatically creating favorite personal cloud data. At 402, user device A 350 identifies that a file is in use. A file may be identified as in use, for example, when user accesses any file either on the cloud or a local or remote device. At 404, user device A 350 sends usage statistics to the metadata manager. The agent running on the user device A 350 sends access details (host of the data, file operation etc.) to metadata manager 300.

At 406, the metadata manager 300 accumulates access details of the file and decides whether the file falls under the criteria of favorites. Once the usage statistics are accumulated, server syncs the statistics/details to all devices, including device B 355, and device C 365, as well as mobile device 450 and favorites storage device 370.

At 408, the agent 375 running on the favorites storage device 370 retrieves file from host based on the details that are received from server opportunistically. The favorites storage device 370 can be paired with any of user's devices and favorite content can be accessed seamlessly. A user can search and access favorite content from favorites storage device even if the host of data is offline. Even if favorites storage device is lost, favorite content can be recovered from server as it maintains map of favorite content and host of the content.

Figure 5:
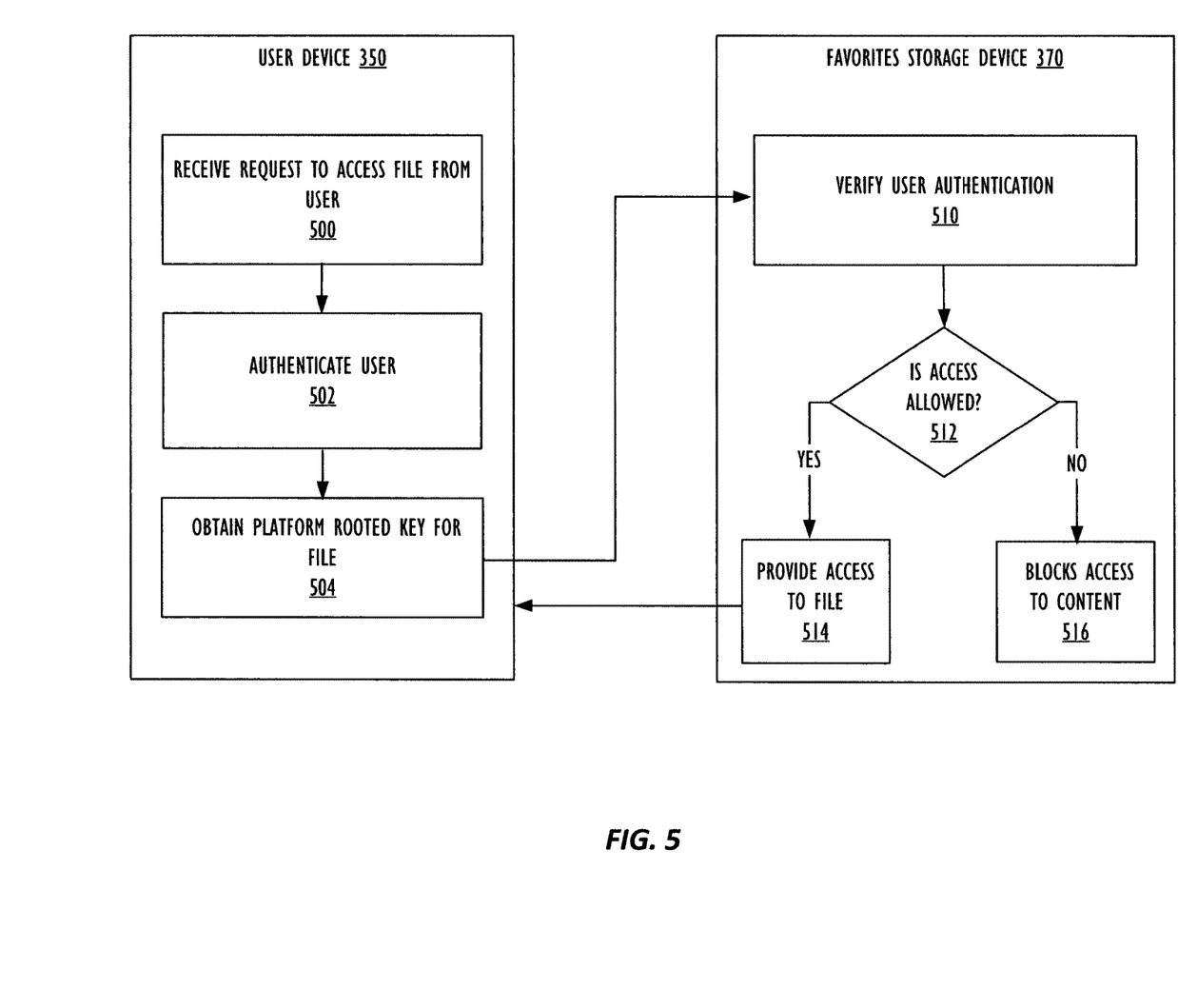
FIG. 5 is a flow diagram illustrating accessing a favorite personal cloud data.

FIG. 5 is a flow diagram illustrating accessing a favorite personal cloud data. Embodiments use biometric authentication 502 to provide security to access favorite content from a user device 350. Companion favorites storage device 370 may use biometric authentication 502 and platform rooted key 504 to verify whether the request is authorized or not. At 508, the key is encrypted with user's biometric hash and stored in server. The favorites storage device 370 verifies 510 user before providing access to favorite content to avoid unauthenticated access. If, at 512, access is allowed, then the requested file 514 is provided. However, if, at 512, access is not allowed, then favorites storage device blocks access to content at 516.

Figure 6:
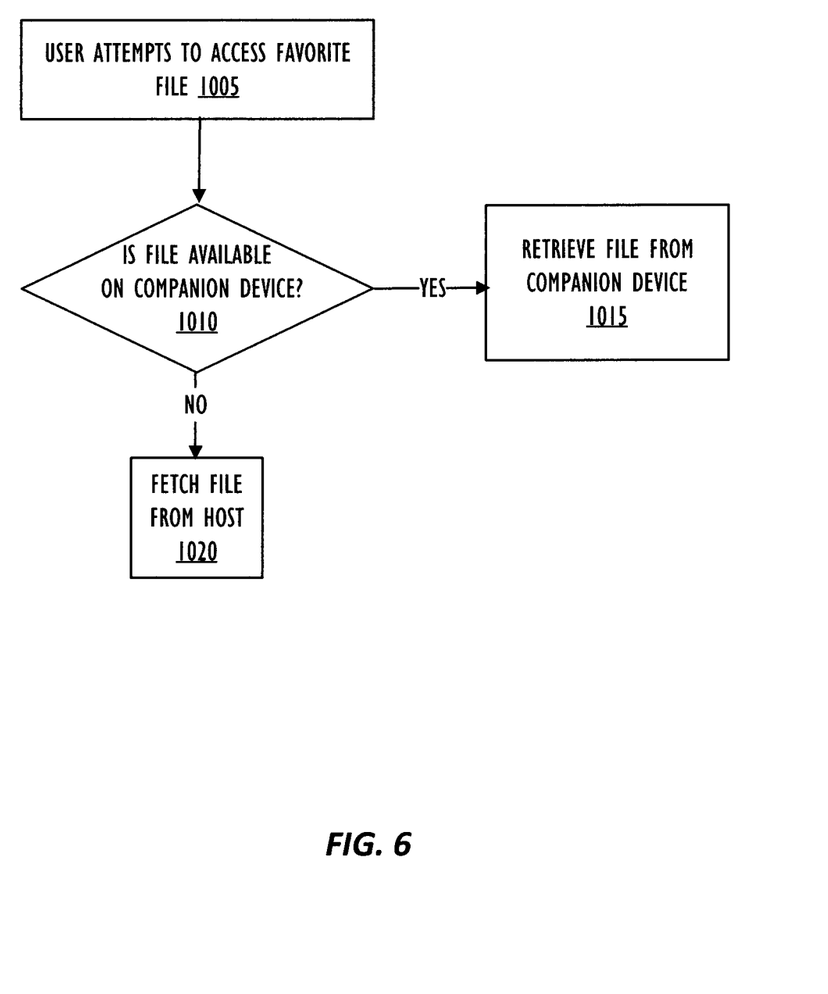
FIG. 6 is a flow diagram illustrating accessing a favorite personal cloud data.

FIG. 6 is a flow diagram illustrating accessing a favorite personal cloud data. At 1005, a user attempts to access a favorite file. User can designate favorites folder on top of unified view. When user access favorite content from unified view of device, both agents running on the current device and favorites storage device communicates via established channel. At 1010, it is determined whether the file is available on the favorites storage device. If so, then at 1015, the file is retrieved from the favorites storage device. The agent on the user's device retrieves the content and makes it available to user seamlessly. However, if not, then at 1020, the file is fetched from its host. The agent on the user's device retrieves the file from the host.

Figure 7:
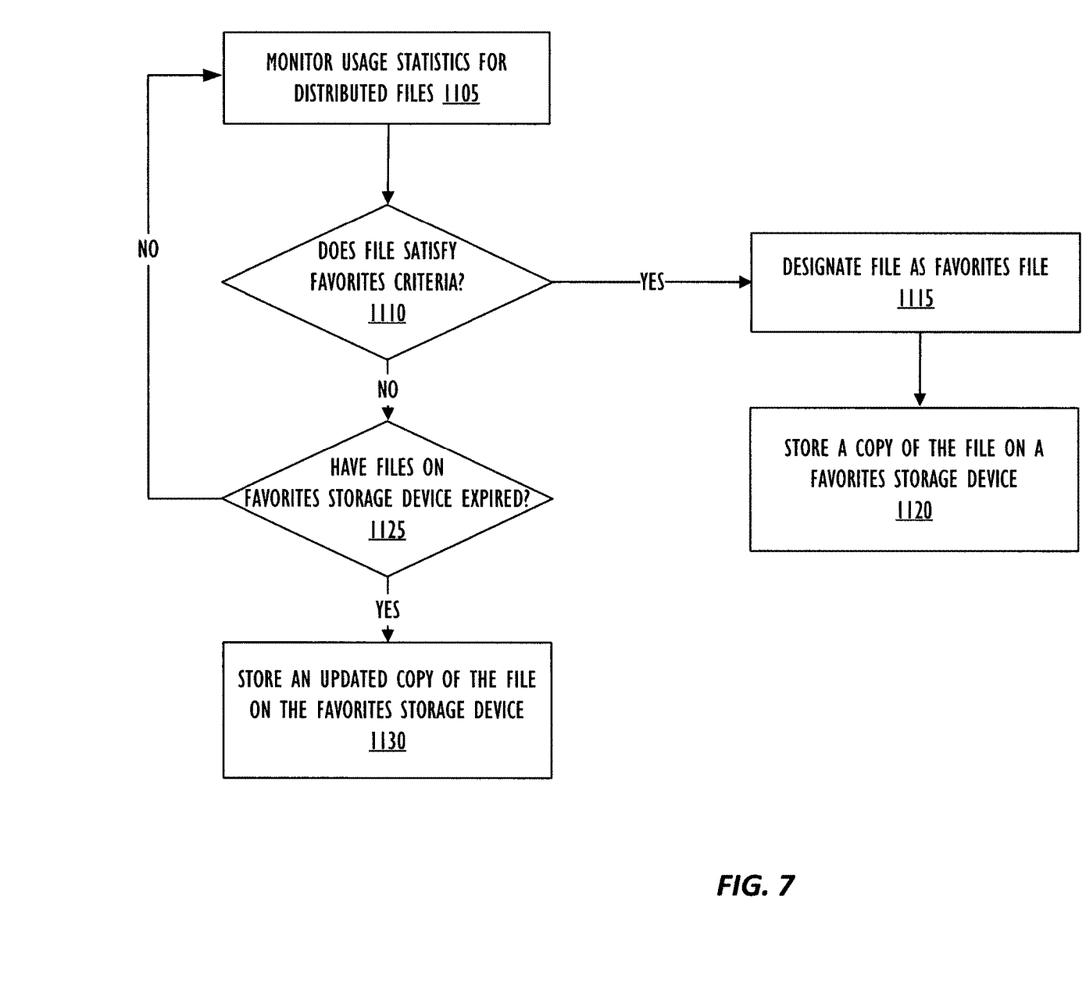
FIG. 7 is a flow diagram illustrating accessing a favorite personal cloud data.

FIG. 7 is a flowchart illustrating accessing a favorite personal cloud data. The flowchart begins at 1105, and usage statistics are monitored for distributed files. In one or more embodiments, usage statistics are monitored for files across a user's personal cloud, which could include a user's multiple personal storage devices, as well as cloud service accounts for the user. In one or more embodiments, a subset of files in a user's personal cloud may be monitored. In one or more embodiments, the subset may be determined based on user-defined content, or any other method.

The flowchart continues at 1110, and a determination is made regarding whether a particular file satisfies favorites criteria. For example, in one or more embodiments, the favorites criteria may determine the likelihood that a user will access a particular file in the near future based on the favorites criteria. In one or more embodiments, favorites criteria may include, for example, satisfying a threshold of frequency of use over time, currently opened files, files related to a current context, or the like. That is, in one or more embodiments, the favorites criteria may take into account a current location of the user, such as home, office, or travel (such as in the car, on a plane, train or other method of transportation). The favorites criteria may also take into account a current time of day or day of the week. For example, a user may be more likely to access work files during a work week or work day, and personal files in the evenings and weekends. As another example, the favorites criteria may also take into consideration similar types of files that have recently been accessed. For example, if several files in a folder have been accessed, the favorites criteria may determine that all files in the folder should be flagged as favorites. As another example, a file may be selected as a favorite if it has similar characteristics to recently accessed files, such as a similar size or a same type.

If it is determined that a file does not satisfy the criteria, then the flowchart continues to 1125 and a determination is made regarding whether any files on the favorites storage device have expired. In one or more embodiments, expiration may be determined based on expiration information for individual files. Further, in one or more embodiments, expiry information may include taking into consideration available storage in the favorites storage device. That is, the expiry information may be tied to available storage. Expiration information may also vary based on the characteristics of the files, such as file size, type of file, or the like. Moreover, in one or more embodiments, expiry information may be based on modifications to the document. For example, if a favorites document is modified on one device, then the expiry information for that document may be updated so that when the document is accessed by another device, it will be noted that the favorites document is expired. If at 1125 it is determined that a file has not expired, then the flowchart returns to 1105, and the usage statistics are continued to be monitored. In one or more embodiments, the distributed files may be monitored continuously, or periodically, or at any other frequency, such as occasionally based on connectivity between the content providers and the use device.

Returning to 1110, if it is determined that a file satisfies favorites criteria, then the flowchart continues at 1115 and the file is designated as a favorites file, and at 1120, a copy of the file is stored on a favorites storage device. Returning to 1125, if it is determined that any of the files on the favorites storage device has expired, then at 1130, an updated copy of the file is retrieved from the content provider from which the file was originally retrieved, and the updated copy is stored on the favorites storage device.

Figure 8A:
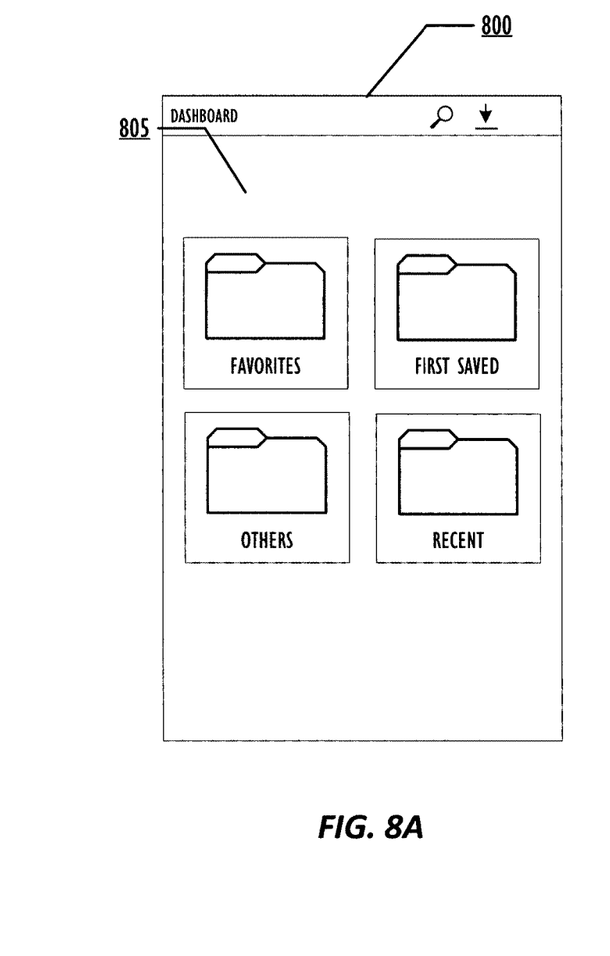
FIG. 8A is an example screenshot illustrating a unified view of all favorite content.
Figure 8B:
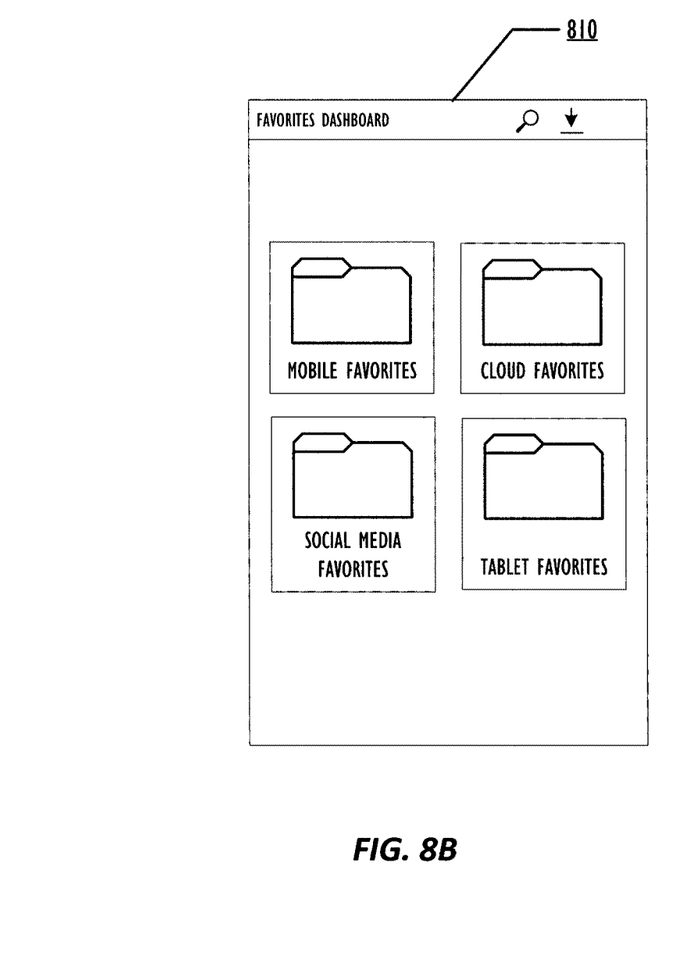
FIG. 8B is an example screenshot illustrating favorite content across all devices and services.
Figure 8C:
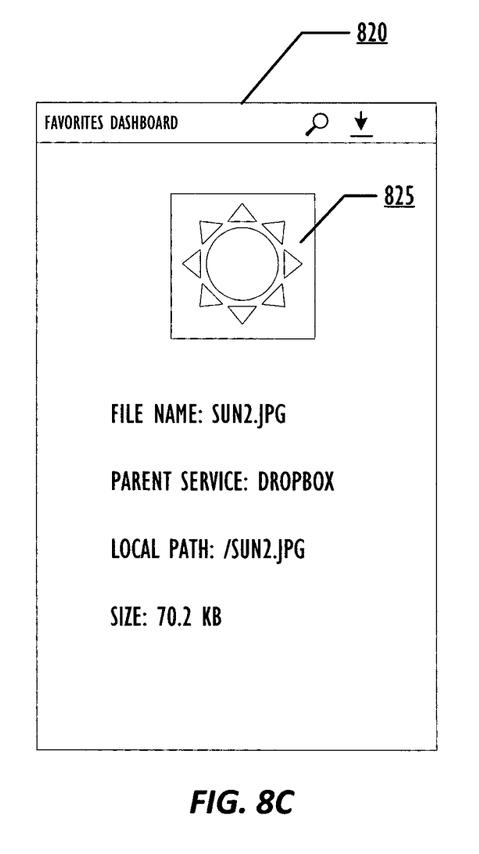
FIG. 8C is an example screenshot illustrating retrieval of favorite personal cloud data.
Figure 8D:
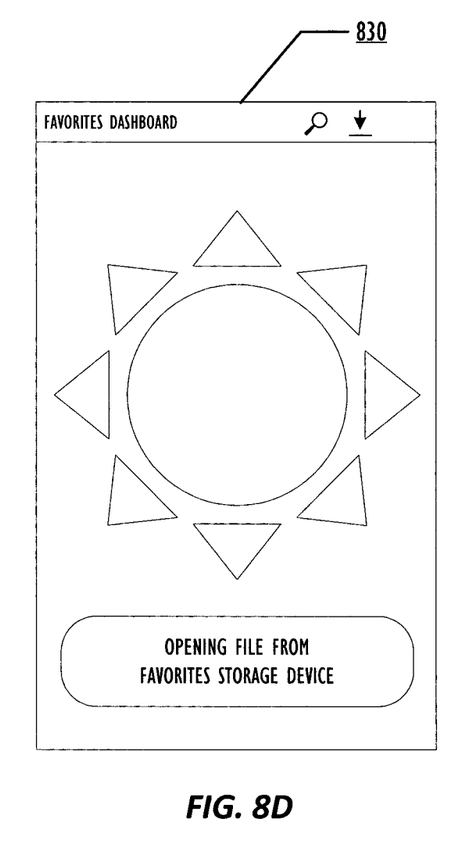
FIG. 8D is an example screenshot illustrating content from a favorites storage device.

FIG. 8A is an example screenshot 800 illustrating a unified view of all favorite content. FIG. 8B is an example screenshot 810 illustrating favorite content across all devices and services. FIG. 8C is an example screenshot 820 illustrating retrieval of favorite personal cloud data. The example screenshot 820 includes a thumbnail version 825 of a file that has been stored as a favorite file. FIG. 8D is an example screenshot 830 illustrating content from a favorites storage device. In the screenshot 830, the thumbnail file 825 has been selected and is displayed in original form.

Figure 9:
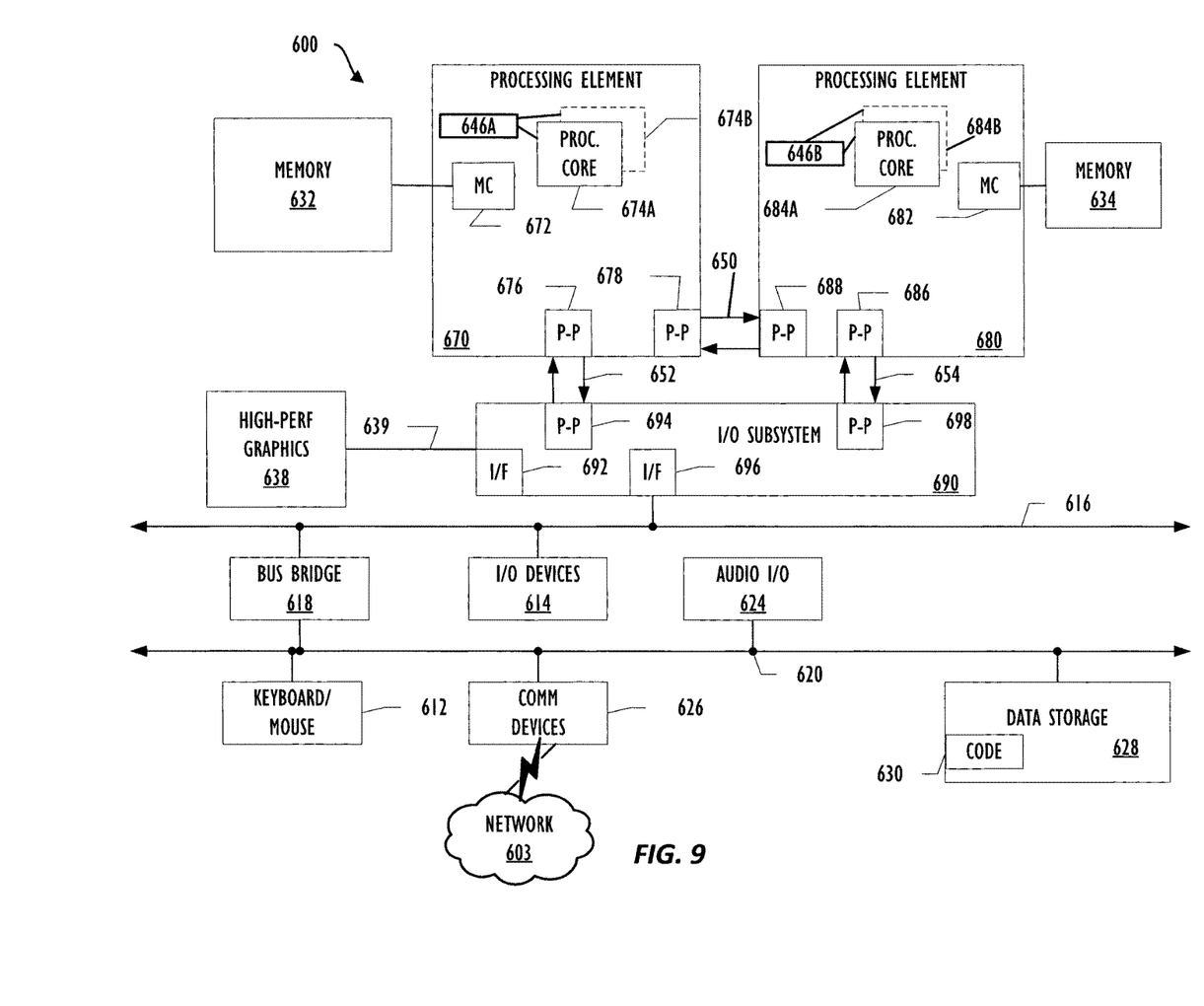
FIG. 9 is a diagram illustrating a computing device for use with techniques described herein according to one embodiment.

Referring now to FIG. 9, a block diagram illustrates a programmable device 600 that may be used within a computing device, in accordance with one or more embodiments. The programmable device 600 illustrated in FIG. 9 is a multiprocessor programmable device that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 9 may be implemented as a multi-drop bus rather than point-to-point interconnects.

As illustrated in FIG. 9, each of processing elements 670 and 680 may be multicore processors, including first and second processor cores (i.e., processor cores 674a and 674b and processor cores 684a and 684b). Such cores 674a, 674b, 684a, 684b may be configured to execute instruction code in a manner similar to that discussed above in connection with FIGS. 1-8. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 9 illustrates a programmable device with two processing elements 670, 680 for clarity of the drawing, the scope of the present invention is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There may be a variety of differences between processing elements 670, 680 in terms of a spectrum of metrics of merit including architectural, microarchitectural, thermal, power consumption characteristics, and the like. These differences may effectively manifest themselves as asymmetry and heterogeneity amongst processing elements 670, 680. In some embodiments, the various processing elements 670, 680 may reside in the same die package.

Figure 10:
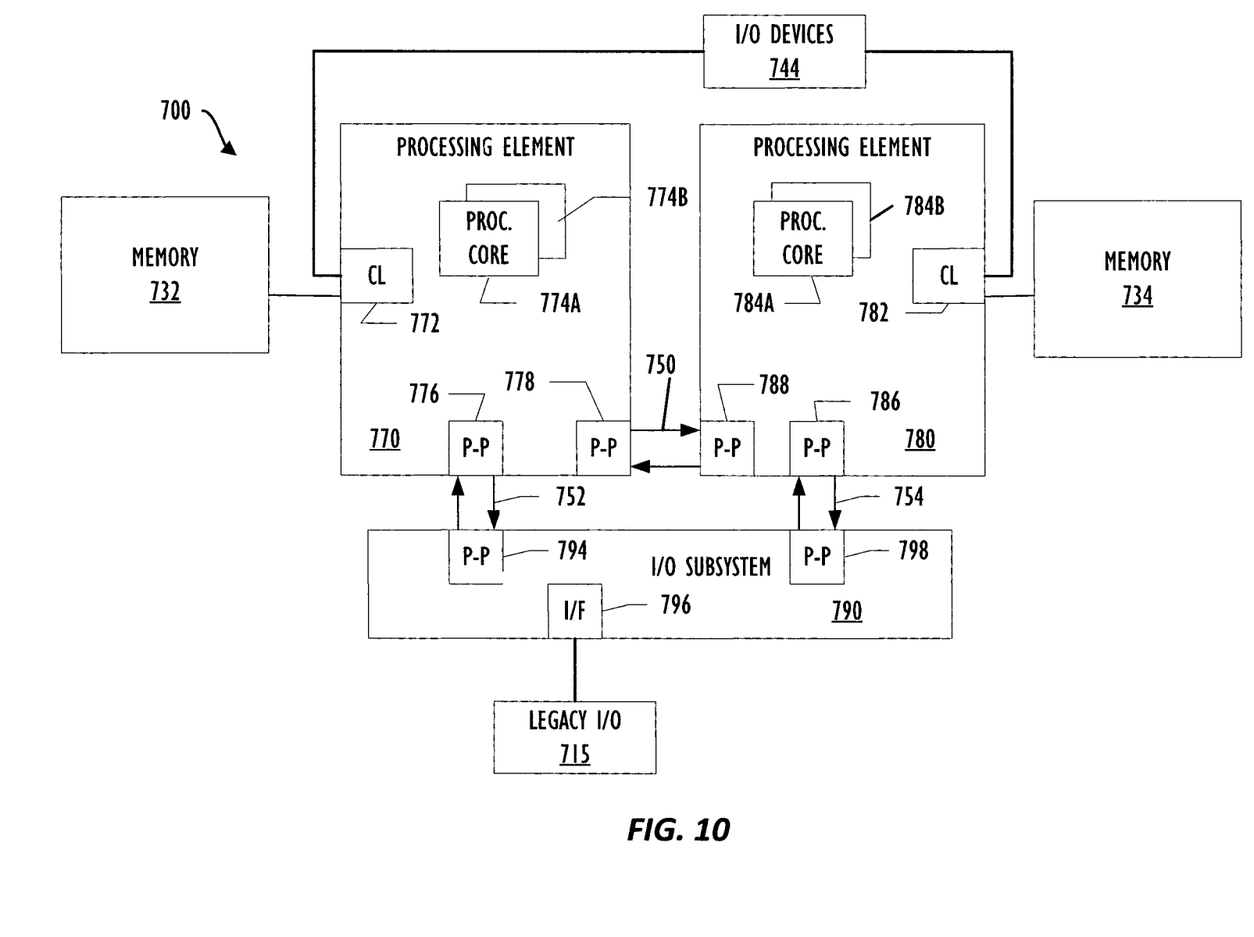
FIG. 10 is a block diagram illustrating a computing device for use with techniques described herein according to another embodiment.

First processing element 670 may further include memory controller logic (MC) 672 and point-to-point (P-P) interconnects 676 and 678. Similarly, second processing element 680 may include a MC 682 and P-P interconnects 686 and 688. As illustrated in FIG. 10, MCs 672 and 682 couple processing elements 670, 680 to respective memories, namely a memory 632 and a memory 634, which may be portions of main memory locally attached to the respective processors. While MC logic 672 and 682 is illustrated as integrated into processing elements 670, 680, in some embodiments the memory controller logic may be discrete logic outside processing elements 670, 680 rather than integrated therein.

Processing element 670 and processing element 680 may be coupled to an I/O subsystem 690 via respective P-P interconnects 676 and 686 through links 652 and 654. As illustrated in FIG. 8, I/O subsystem 690 includes P-P interconnects 694 and 698. Furthermore, I/O subsystem 690 includes an interface 692 to couple I/O subsystem 690 with a high performance graphics engine 638. In one embodiment, a bus (not shown) may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 9, various I/O devices 614, 624 may be coupled to first link 616, along with a bridge 618 which may couple first link 616 to a second link 620. In one embodiment, second link 620 may be a low pin count (LPC) bus. Various devices may be coupled to second link 620 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second bus 620.

Note that other embodiments are contemplated. For example, instead of the point-to-point architecture of FIG. 9, a system may implement a multi-drop bus or another such communication topology. Although links 616 and 620 are illustrated as busses in FIG. 9, any desired type of link may be used. Also, the elements of FIG. 9 may alternatively be partitioned using more or fewer integrated chips than illustrated in FIG. 9.

Referring now to FIG. 10, a block diagram illustrates a programmable device 700 according to another embodiment. Certain aspects of FIG. 9 have been omitted from FIG. 10 in order to avoid obscuring other aspects of FIG. 9.

FIG. 10 illustrates that processing elements 770, 780 may include integrated memory and I/O control logic ("CL") 772 and 782, respectively. In some embodiments, the 772, 782 may include memory control logic (MC) such as that described above in connection with FIG. 9. In addition, CL 772, 782 may also include I/O control logic. FIG. 10 illustrates that not only may the memories 732, 734 be coupled to the 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 9 as processor cores 774A, 774B, 784A, and 784B. As illustrated in FIG. 10, I/O subsystem 790 includes P-P interconnects 794 and 798 that connect to P-P interconnects 776 and 786 of the processing elements 770 and 780 with links 752 and 754. Processing elements 770 and 780 may also be interconnected by link 750 and interconnects 778 and 788, respectively.

The programmable devices depicted in FIGS. 9 and 10 are schematic illustrations of embodiments of programmable devices which may be utilized to implement various embodiments discussed herein. Various components of the programmable devices depicted in FIGS. 9 and 10 may be combined in a system-on-a-chip (SoC) architecture.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

The following examples pertain to further embodiments.

Example 1 is a machine readable medium on which instructions are stored, comprising instructions that when executed cause a machine to: dynamically monitor usage statistics for a plurality of files, wherein the plurality of files are located on a plurality of devices; designate, based on favorites criteria, a first file of the plurality of files as a favorite file; and in response to designating the first file as a favorite file, storing a copy of the first file on a favorites storage device.

In Example 2 the subject matter of Example 1 optionally includes further comprising instructions that when executed cause the machine to: periodically update the favorites files designated and stored on the favorites storage device.

In Example 3 the subject matter of Example 7 is a system for managing distributed data, comprising: a computer processor; and a storage device coupled to the computer processor comprising instructions which, when executed by the processor, cause the computer processor to: dynamically monitor usage statistics for a plurality of files, wherein the plurality of files are located on a plurality of devices; designate, based on favorites criteria, a first file of the plurality of files as a favorite file; and in response to designating the first file as a favorite file, storing a copy of the first file on a favorites storage device.

In Example 8 the subject matter of Example 7 optionally includes further comprising instructions that when executed cause the computer processor to:

periodically update the favorites files designated and stored on the favorites storage device.

Example 13 is a method for managing distributed data, comprising: dynamically monitoring usage statistics for a plurality of files, wherein the plurality of files are located on a plurality of devices; designate, based on favorites criteria, a first file of the plurality of files as a favorite file; and in response to designating the first file as a favorite file, storing a copy of the first file on a favorites storage device.

In Example 14 the subject matter of Example 13 optionally includes further comprising: periodically update the favorites files designated and stored on the favorites storage device.

Example 19 is a machine readable medium on which instructions are stored, comprising instructions that when executed cause a machine to: receive an indication that a file is designated as a favorite file from a user device; retrieve the file from a remote location; store the file as a first favorite file on a favorites storage device; re-retrieve the file from the remote location; and update the first favorite file with the re-retrieved file.

In Example 20 the subject matter of Example 19 optionally includes wherein the instructions further cause the machine to: receive a request from a user on the user device to retrieve the first favorite file; verify the user has permission to access the first favorite file; and in response to verifying the user has permission, providing access to the first favorite file on the favorites storage device.

In Example 21 the subject matter of Example 19 optionally includes wherein re-retrieving the file from the remote location further comprises resetting expiration information for the file.

Example 26 is a method for managing distributed data, comprising: receiving an indication that a file is designated as a favorite file from a user device; retrieving the file from a remote location; storing the file as a first favorite file on a favorites storage device; re-retrieving the file from the remote location; and updating the first favorite file with the re-retrieved file.

In Example 27 the subject matter of Example 26 optionally includes further comprising: receiving a request from a user on the user device to retrieve the first favorite file; verifying the user has permission to access the first favorite file; and in response to verifying the user has permission, providing access to the first favorite file on the favorites storage device.

In Example 28 the subject matter of Example 26 optionally includes wherein re-retrieving the file from the remote location further comprises resetting expiration information for the file.

Example 33 is a machine readable medium including code, when executed, to cause a machine to perform the methods of Examples 13 and 14.

Example 34 is a machine readable medium including code, when executed, to cause a machine to perform the methods of Examples 26-28.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A machine readable storage device or storage disk comprising instructions that, when executed, cause a machine to at least:
   synchronize, between a metadata manager and first agents that execute on a plurality of devices, usage statistics collected by the first agents, the usage statistics corresponding to usage by a single user of a plurality of files across the plurality of devices, the plurality of files stored in the plurality of devices;
   designate a first file of the plurality of files as a favorite file of the user based on determining that at least one of the usage statistics of the first file satisfies a plurality of favorites criteria, the favorites criteria to include threshold heuristics to determine whether a particular file is likely to be accessed within a predetermined time;
   in response to designating the first file as the favorite file:
      (a) obtain a copy of the first file from a first device of the plurality of devices;
      (b) store the copy of the first file in a favorites storage device for access by the user even when the first device is not accessible; and
      (c) synchronize the usage statistics with a second agent of the favorites storage device;
   designate a second file of the plurality of files as a favorite file based on the favorites criteria and characteristics of the second file; and
   store a copy of the second file in the favorites storage device, the first file and the second file originally stored in different storage devices.

2. The machine readable storage device or storage disk of claim 1, wherein the instructions, when executed, further cause the machine to:
   periodically update the first file stored in the favorites storage device.

3. The machine readable storage device or storage disk of claim 1, wherein the instructions, when executed, further cause the machine to monitor the usage statistics by identifying a usage history of the plurality of files.

4. A system for managing distributed data, comprising:
   a computer processor;
   a favorites storage device, in communication with the computer processor; and
   a second storage device in circuit with the computer processor, the storage device including instructions which, when executed by the computer processor, cause the computer processor to:
      synchronize, between a metadata manager and first agents that execute on a plurality of devices, usage statistics collected by the first agents, the usage statistics corresponding to usage by a single user of a plurality of files across the plurality of devices, the plurality of files stored in the plurality of devices;
      designate a first file of the plurality of files as a favorite file of the user based on determining that at least one of the usage statistics of the first file satisfies a plurality of favorites criteria, the favorites criteria to include threshold heuristics to determine whether a particular file is likely to be accessed within a predetermined time;
      in response to designating the first file as the favorite file:
         (a) obtain a copy of the first file from a first device of the plurality of devices;
         (b) store the copy of the first file in the favorites storage device for access by the user even when the first device is not accessible; and
         (c) synchronize the usage statistics with a second agent of the favorites storage device;
      designate a second file of the plurality of files as a favorite file based on the favorites criteria and characteristics of the second file; and
      store a copy of the second file in the favorites storage device, the first file and the second file originally stored in different storage devices.

5. The system of claim 4, wherein the instructions, when executed, further cause the computer processor to:
   periodically update the first file stored in the favorites storage device.

6. The system of claim 4, wherein the instructions, when executed, further cause the computer processor to monitor the usage statistics by identifying a usage history of the plurality of files.

7. A method for managing distributed data, the method comprising:
   synchronizing, between a metadata manager and first agents that execute on a plurality of devices, usage statistics collected by the first agents, the usage statistics corresponding to usage by a single user of a plurality of files across the plurality of devices, the plurality of files stored in the plurality of devices;
   determining a first file of the plurality of files satisfies a plurality of favorites criteria, the favorites criteria to include threshold heuristics to determine whether a particular file is likely to be accessed within a given time period;
   in response to the first file satisfying the favorites criteria:
      (a) obtaining a copy of the first file from a first device;
      (b) storing the copy of the first file in a favorites storage device for access by the user even when the first device is not accessible; and
      (c) synchronizing the usage statistics with an agent of the favorites storage device;
   designating a second file of the plurality of files as a favorite file based on the favorites criteria and characteristics of the second file; and
   storing a copy of the second file in the favorites storage device, the first file and the second file originally stored in different storage devices.

8. The method of claim 7, further including:
   periodically updating the first file stored in the favorites storage device.

9. The method of claim 7, further including monitoring the usage statistics by identifying a usage history of the plurality of files.

\* \* \* \* \*